(12) United States Patent
Bo et al.

(10) Patent No.: US 12,235,550 B2
(45) Date of Patent: Feb. 25, 2025

(54) DISPLAY PANEL AND DISPLAY DEVICE

(71) Applicants: Beijing BOE Display Technology Co., Ltd., Beijing (CN); BOE Technology Group Co., Ltd., Beijing (CN)

(72) Inventors: Lingdan Bo, Beijing (CN); Yingying Qu, Beijing (CN); Dongchuan Chen, Beijing (CN); Jianhua Huang, Beijing (CN); Ting Dong, Beijing (CN); Yifu Chen, Beijing (CN); Chongyang Zhao, Beijing (CN); Jiantao Liu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/562,348

(22) PCT Filed: Oct. 22, 2021

(86) PCT No.: PCT/CN2021/125512
§ 371 (c)(1),
(2) Date: Nov. 20, 2023

(87) PCT Pub. No.: WO2022/242027
PCT Pub. Date: Nov. 24, 2022

(65) Prior Publication Data
US 2024/0241411 A1 Jul. 18, 2024

(30) Foreign Application Priority Data
May 21, 2021 (CN) .......................... 202110555311.4

(51) Int. Cl.
*G02F 1/1343* (2006.01)
*G02F 1/1339* (2006.01)
*G02F 1/1362* (2006.01)

(52) U.S. Cl.
CPC ...... *G02F 1/136209* (2013.01); *G02F 1/1339* (2013.01); *G02F 1/13439* (2013.01); *G02F 1/136286* (2013.01)

(58) Field of Classification Search
CPC ............. G02F 1/136209; G02F 1/1339; G02F 1/13439; G02F 1/136286; G02F 1/13394
See application file for complete search history.

(56) References Cited

U.S. PATENT DOCUMENTS 9,448,452 B2  9/2016  Lee
9,773,819 B2  9/2017  Cheng et al.
(Continued)

FOREIGN PATENT DOCUMENTS

CN  101825814 A  9/2010
CN  102073175 A  5/2011
(Continued)

OTHER PUBLICATIONS

International Search Report for PCT/CN2021/125512 Mailed Feb. 8, 2022.
(Continued)

*Primary Examiner* — James A Dudek
(74) *Attorney, Agent, or Firm* — Ling Wu; Stephen Yang; Ling and Yang Intellectual Property

(57) ABSTRACT

A display panel and a display device are provided. The display panel includes: an array substrate, a cell-assembling substrate, and a liquid crystal layer located therebetween. The array substrate includes a first base, and the first base comprises sub-pixel regions (A), a first trace region (B) located between two adjacent rows of sub-pixel regions (A), and a second trace region (C) located between two adjacent columns of sub-pixel regions (A). Gate lines (1) are located in the first trace region (B). Data lines (2) are located in the second trace region (C), each data line (2) has a support
(Continued)

portion (21), and the support portion (21) is located in an intersection region of the first trace region (B) and the second trace region (C). Sub-pixel units are located in the sub-pixel region (A), and the sub-pixel units includes a common electrode (4).

9 Claims, 2 Drawing Sheets

(56) References Cited

U.S. PATENT DOCUMENTS

| | | | |
|---|---|---|---|
| 10,921,651 B2 | 2/2021 | Wang et al. | |
| 2001/0046003 A1 | 11/2001 | Song | |
| 2014/0125626 A1* | 5/2014 | Yang | G06F 3/0443 |
| | | | 345/174 |
| 2014/0125909 A1 | 5/2014 | Kim | |
| 2014/0347586 A1* | 11/2014 | Wang | G02F 1/13394 |
| | | | 349/43 |
| 2017/0102575 A1* | 4/2017 | Yasukawa | G02F 1/13394 |
| 2018/0095334 A1* | 4/2018 | Zang | G02F 1/133707 |
| 2021/0055611 A1* | 2/2021 | Chung | G02F 1/136286 |
| 2022/0291558 A1 | 9/2022 | Su et al. | |

FOREIGN PATENT DOCUMENTS

| | | |
|---|---|---|
| CN | 102937768 A | 2/2013 |
| CN | 103187422 A | 7/2013 |
| CN | 103246117 A | 8/2013 |
| CN | 104133334 A | 11/2014 |
| CN | 203941365 U | 11/2014 |
| CN | 104536190 A | 4/2015 |
| CN | 104730780 A | 6/2015 |
| CN | 104730785 A | 6/2015 |
| CN | 106405951 A | 2/2017 |
| CN | 107037628 A | 8/2017 |
| CN | 108873522 A | 11/2018 |
| CN | 111338144 A | 6/2020 |
| CN | 215340638 U | 12/2021 |
| JP | 2001337349 A | 12/2001 |

OTHER PUBLICATIONS

Office Action dated Dec. 4, 2024 for Chinese Patent Application No. 202110555311.4 and English Translation.

* cited by examiner

DISPLAY PANEL AND DISPLAY DEVICE

CROSS-REFERENCE TO RELATED APPLICATION

The present application is a U.S. National Phase Entry of International Application No. PCT/CN2021/125512 having an international filing date of Oct. 22, 2021, which claims the priority to the Chinese patent application No. 202110555311.4 entitled "Display Panel and Display Device", filed to the CNIPA on May 21, 2021, the above-identified applications are hereby incorporated by reference.

TECHNICAL FIELD

The present application relates to the technical field of display, in particular to a display panel and a display device.

BACKGROUND

In recent years, due to the demand of high resolution, the PPI (pixel density) of TV products is increasing, and the size of a single pixel is also decreasing. Under the premise of meeting BM design rules, the aperture ratio is also greatly reduced. Therefore, high transmittance has become one of the performances pursued by TV products, especially for current high-resolution products, such as improving the transmittance of pixel structure based on 8K Dual Gate (two gate lines driven at the same time) has become very urgent. Therefore, how to improve the transmittance of current high-resolution display products is an urgent problem to be solved at present.

SUMMARY

The application provides a display panel and a display device, which are used for reducing the width of a light shielding layer to increase the pixel aperture ratio and improve the light transmittance.

In order to achieve the above purpose, the invention provides the following technical schemes.

A display panel including: an array substrate, a cell-assembling substrate opposite to the array substrate, and a liquid crystal layer located between the array substrate and the cell-assembling substrate; the array substrate includes: a first substrate including a plurality of sub-pixel regions distributed in an array, a first wire region located between two adjacent rows of sub-pixel regions and a second wire region located between two adjacent columns of sub-pixel regions; a gate line located in the first wire region and extending along the first wire region; a data line located in the second wire region and extending along the second wire region, the data line is provided with a support portion, and the support portion is located in the intersection region of the first wire region and the second wire region; a sub-pixel unit located in the sub-pixel region, the sub-pixel unit including a pixel electrode, a common electrode and a thin film transistor; the thin film transistor is electrically connected with the gate line and is electrically connected with the data line; the pixel electrode is electrically connected with the thin film transistor, and the orthographic projection of the common electrode on the first substrate overlaps the orthographic projection of a corresponding gate line on the first substrate; a spacer, the orthographic projection of the spacer on the first substrate is located within the orthographic projection of the support portion on the first substrate; the liquid crystal layer includes a negative liquid crystal.

In the above display panel, an array substrate and a cell-assembling substrate are included, the cell-assembling substrate is arranged opposite to the array substrate, a liquid crystal layer is provided between the array substrate and the cell-assembling substrate, the array substrate includes a first substrate, the first substrate is provided with a plurality of sub-pixel regions distributed in an array, a first wire region located between two adjacent rows of sub-pixel regions and a second wire region located between two columns of sub-pixel regions. The first wire region and the second wire region are intersected. A plurality of gate lines are provided on the first substrate, the gate lines are arranged in the first wire region and extend along the direction in which the first wire region extends. The first substrate is also provided with a plurality of data lines, the data lines are arranged in the second wire region and extend along the direction in which the second wire region extends. The gate lines and the data lines are insulated from each other and are intersected. a plurality of sub-pixel units are provided on the first substrate, the sub-pixel units and the sub-pixel regions can be arranged one-to-one correspondingly, the sub-pixel unit is located in the sub-pixel region, the sub-pixel unit is electrically connected with the gate line and is electrically connected with the data line, the sub-pixel unit includes a pixel electrode, a common electrode and a thin film transistor, the thin film transistor is electrically connected with the gate line and is electrically connected with the data line, and the thin film transistor is electrically connected with the pixel electrode; in a same pixel unit, the orthographic projection of the common electrode on the first substrate overlaps the orthographic projection of the gate line electrically connected with the pixel unit, the common electrode extends to the gate line connected with the pixel unit where the common electrode is located, and in the direction perpendicular to the first substrate, the common electrode has an overlapping portion with the corresponding gate line, the common electrode can play the role of shielding the electric field, to shield the electric field between the gate line and the pixel electrode, avoid the electric field between the gate line and the pixel electrode affecting the liquid crystal and causing light leakage, because the common electrode shields the electric field between the gate line and the pixel electrode, and there is no light leakage between the gate line and the pixel electrode, the width of the corresponding light shielding layer at the gate line can be reduced, which increases pixel aperture ratio and enhances the light transmittance; in order to separate a space between the array substrate and the cell-assembling substrate, a spacer for support can be provided between the array substrate and the cell-assembling substrate, herein, the spacer is arranged at a position corresponding to the data line, a support portion is arranged on the data line, the support portion is located in the region where the first wire region and the second wire region intersect, the spacer is arranged in the position of the support portion of the data line, the orthographic projection of the spacer on the first substrate is located in the orthographic projection of the support portion on the first substrate, when the display panel receives the impact of external forces, the spacer will slide, generally sliding is mainly concentrated in the column direction, the sliding of the spacer in the column direction is relatively more, if the spacer is arranged at the site corresponding to the data line, oblique sliding rarely occurs, and the sliding in the row direction is very small, therefore, compared with the prior art, the width of the light shielding layer extending along the row direction can be reduced, the pixel aperture ratio can be increased, and the transmittance can be effectively improved; in addition, for the above liquid crystal layer, the liquid crystal in the liquid crystal layer is a negative liquid crystal, and the oblique electric field between the data line and the pixel electrode does not interfere with the negative liquid crystal and does not cause light leakage, so the width of the light shielding layer corresponding to the data line can be reduced, which is beneficial to increasing the pixel aperture ratio and improving the light transmittance.

Therefore, in the above display panel, the width of the light shielding layer can be reduced to increase the pixel aperture ratio and effectively improve the light transmittance.

Optionally, the data line further includes wire portions located on opposite sides of the support portion in a column direction; the size of the wire portion in a row direction is less than that of the support portion in the row direction.

Optionally, the pixel electrode or the common electrode within each sub-pixel unit includes electrode strips arranged in a single domain.

Optionally, the cell-assembling substrate is a color film substrate, and a BM layer is provided on a side of the color film substrate toward the array substrate, and the BM layer includes a first shielding portion extending in the row direction and a second shielding portion extending in the column direction, the orthographic projection of the first shielding portion on the first substrate covers the first wire region, and the orthographic projection of the second shielding portion on the first substrate covers the second wire region.

Optionally, the first wire region is provided between each adjacent two rows of sub-pixel regions, and two gate lines are provided in each first wire region; two columns of the sub-pixel regions are provided between each adjacent two second wire regions, and one data line is provided in each second wire region; in the row direction, a common electrode line extending in the column direction is provided between two sub-pixel regions between each adjacent two second wire regions, and the common electrode line is electrically connected with the common electrode.

Optionally, the cell-assembling substrate is a color film substrate, and a BM layer is provided on a side of the color film substrate toward the array substrate, and the BM layer includes a first shielding portion extending in the row direction and a second shielding portion extending in the column direction, the orthographic projection of the first shielding portion on the first substrate covers the first wire region; the second shielding portion includes a first sub-shielding portion and a second sub-shielding portion, the orthographic projection of the first sub-shielding portion on the first substrate covers the second wire region, and the orthographic projection of the second sub-shielding portion on the first substrate covers the orthographic projection of the common electrode line on the first substrate.

Optionally, the pixel electrode includes ITO.

Optionally, the common electrode includes ITO.

Optionally, the thin film transistor includes a gate electrode electrically connected with the gate line, an active layer, a source electrode electrically connected with the data line, and a drain electrode electrically connected with the pixel electrode.

The application further provides a display device, which includes any display panel provided by the above technical solutions.

Reference signs: 1—Gate line; 2—Data line; 3—Pixel electrode; 4—Common electrode; 5—Thin film transistor; 6—Spacer; 7—BM layer; 8—Common electrode line; 21—Support portion; 22—Wire portion; 71—First shielding portion; 72—Second shielding portion; 721—First sub-shielding portion; 722—Second sub-shielding portion; A—Sub-pixel region; B—First wire region; C—Second wire region.

DETAILED DESCRIPTION

The technical schemes in the embodiments of present application will be described clearly and completely with reference to the drawings in the embodiments of present application. The described embodiments are apparently only part of the embodiments of the present application, rather than all of the embodiments. Based on the embodiments of the present application, all other embodiments obtained by a person of ordinary skill in the art without paying any inventive effort are within the scope of protection of the present application.

Figure 1:
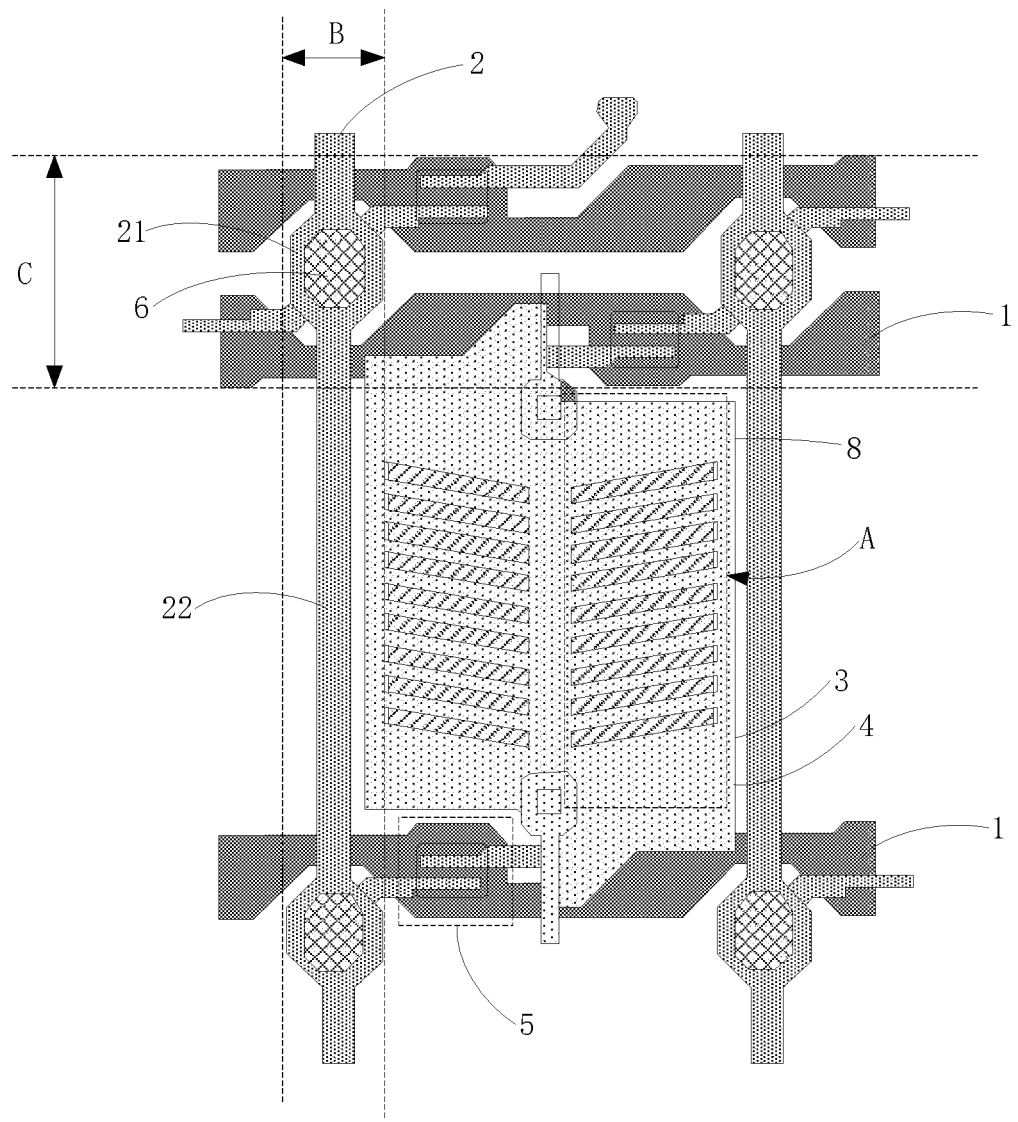
FIG. 1 is a schematic diagram of a partial structure of a display panel provided by an embodiment of the present application.
Figure 2:
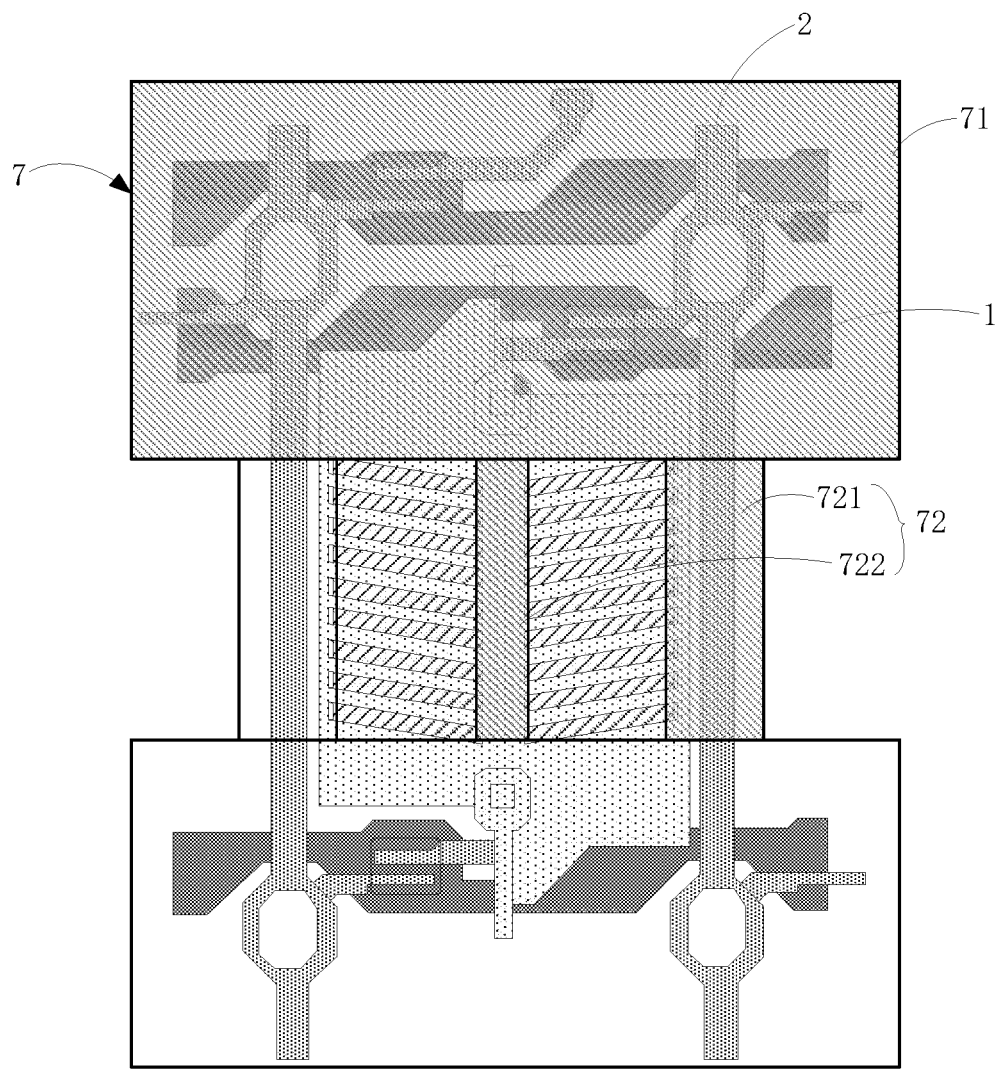
FIG. 2 is a schematic diagram of BM layer distribution on a display panel provided by an embodiment of the present application.

As shown in FIGS. 1 and 2, an embodiment of the present invention provides a display panel, comprising: an array substrate, a cell-assembling substrate opposite to the array substrate, and a liquid crystal layer located between the array substrate and the cell-assembling substrate; the array substrate comprises: a first substrate comprising a plurality of sub-pixel regions A distributed in an array, a first wire region B located between two adjacent rows of sub-pixel regions and a second wire region C located between two adjacent columns of sub-pixel regions; a gate line 1 located in the first wire region B and extending along the first wire region B; a data line 2 located in the second wire region C and extending along the second wire region C, herein the data line 2 is provided with a support portion 21, the support portion 21 is located in the intersection region of the first wire region B and the second wire region C; a sub-pixel unit located in a sub-pixel region A, the sub-pixel unit comprises a pixel electrode 3, a common electrode 4 and a thin film transistor 5; the thin film transistor 5 is electrically connected with the gate line 1 and electrically connected with the data line 2; the pixel electrode 3 is electrically connected the thin film transistor 5, and the orthographic projection of the common electrode 4 on the first substrate overlaps the orthographic projection of the corresponding gate line 1 on the first substrate; a spacer 6, herein the orthographic projection of the spacer 6 on the first substrate is located within the orthographic projection of the support portion 21 on the first substrate; the liquid crystal layer includes a negative liquid crystal.

In the above display panel, an array substrate and a cell-assembling substrate are included, the cell-assembling substrate is arranged opposite to the array substrate, a liquid crystal layer is provided between the array substrate and the cell-assembling substrate, the array substrate comprises a first substrate, the first substrate is provided with a plurality of sub-pixel regions distributed in an array, a first wire region located between two adjacent rows of sub-pixel regions and a second wire region located between two columns of sub-pixel regions. The first wire region and the second wire region are intersected. A plurality of gate lines are provided on the first substrate, the gate lines are arranged in the first wire region and extend along the direction in which the first wire region extends. The first substrate is also provided with a plurality of data lines, the data lines are arranged in the second wire region and extend along the direction in which the second wire region extends. The gate lines and the data lines are insulated from each other and are intersected. a plurality of sub-pixel units are provided on the first substrate, the sub-pixel units and the sub-pixel regions can be arranged one-to-one correspondingly, the sub-pixel unit is located in the sub-pixel region, the sub-pixel unit is electrically connected with the gate line and is electrically connected with the data line, the sub-pixel unit comprises a pixel electrode, a common electrode and a thin film transistor, the thin film transistor is electrically connected with the gate line and is electrically connected with the data line, and the thin film transistor is electrically connected with the pixel electrode; in a same pixel unit, the orthographic projection of the common electrode on the first substrate overlaps the orthographic projection of the gate line electrically connected with the pixel unit, the common electrode extends to the gate line connected with the pixel unit where the common electrode is located, and in the direction perpendicular to the first substrate, the common electrode has an overlapping portion with the corresponding gate line, the common electrode can play the role of shielding the electric field, to shield the electric field between the gate line and the pixel electrode, avoid the electric field between the gate line and the pixel electrode affecting the liquid crystal and causing light leakage, because the common electrode shields the electric field between the gate line and the pixel electrode, and there is no light leakage between the gate line and the pixel electrode, the width of the corresponding light shielding layer at the gate line can be reduced, which increases pixel aperture ratio and enhances the light transmittance; in order to separate a space between the array substrate and the cell-assembling substrate, a spacer can be provided between the array substrate and the cell-assembling substrate for support, wherein the spacer is arranged at a position corresponding to the data line, a support portion is arranged on the data line, the support portion is located in the region where the first wire region and the second wire region intersect, the spacer is arranged in the position of the support portion of the data line, the orthographic projection of the spacer on the first substrate is located in the orthographic projection of the support portion on the first substrate, when the display panel receives the impact of external forces, the spacer will slide, generally sliding is mainly concentrated in the column direction, the sliding of the spacer in the column direction is relatively more, when the spacer is arranged at the site corresponding to the data line, oblique sliding rarely occurs, and the sliding in the row direction is very small, therefore, compared with the prior art, the width set for the light shielding layer extending along the row direction can be reduced, the pixel aperture ratio can be increased, and the transmittance can be effectively improved; in addition, for the above-described liquid crystal layer, the liquid crystal in the liquid crystal layer is a negative liquid crystal, and the oblique electric field between the data line and the pixel electrode does not interfere with the negative liquid crystal and does not cause light leakage, so the width of the light shielding layer corresponding to the data line can be reduced, which is beneficial to increasing the pixel aperture ratio and improving the light transmittance.

Therefore, in the above-described display panel, the width of the light shielding layer can be reduced to increase the pixel aperture ratio and effectively improve the light transmittance.

Specifically, as shown in FIG. 1, the data line 2 in the above-described display panel further includes wire portions 22 located on opposite sides of the support portion 21 in the column direction; the size of the wire portion 22 in the row direction is less than that of the support portion 21 in the row direction, the wire portion of the data line corresponds to the sub-pixel region, and the width set for the wire portion between two adjacent sub-pixel regions in the row direction is relatively small, the width of the corresponding light shielding layer can be reduced, which is beneficial to increasing the pixel aperture ratio and improving the transmittance; the width of the support portion is larger than the width set for the wire portion, the size of the spacer in the row direction can be appropriately increased, so that the bottom surface of the spacer is larger and more stable, which is beneficial to improving the support stability. Furthermore, the support portion is located in the region where the first wire region and the second wire region intersect, appropriately increasing the width of the wire portion in the row direction, that is, appropriately increasing the width of the spacer in the row direction, is equivalent to extending a certain width in the first wire region, which cannot cause the width change of the corresponding light shielding layer.

Specifically, in the above-described display panel, the pixel electrode or the common electrode in each sub-pixel unit includes electrode strips arranged in a single domain. The pixels in the sub-pixel unit are arranged in a single-domain pixel structure, which can reduce the intermediate dark field and improve the transmittance, and in the high-resolution pixel structure, the single-domain pixel structure does not have a viewing angle problem.

Specifically, in conjunction with FIG. 1, as shown in FIG. 2, in the above-described display panel, the cell-assembling substrate is a color film substrate, and a side of the color film substrate toward the array substrate is provided with a BM layer 7, the BM layer here is the light shielding layer mentioned above, herein, the BM layer 7 includes a first shielding portion 71 extending in the row direction and a second shielding portion 72 extending in the column direction, and the orthographic projection of the first shielding portion on the first substrate covers the first wire region, and the orthographic projection of the second shielding portion on the first substrate covers the second wire region. With the structure of the above-described display panel, the widths of the first shielding portion and the second shielding portion in this embodiment can be appropriately reduced, and compared with the prior art, the pixel aperture ratio is increased and the transmittance is improved.

Specifically, as shown in FIG. 1, in the above-described display panel, as a way of arranging gate lines and data lines, a first wire region B is provided between two adjacent rows of sub-pixel regions A, and two gate lines 1 are provided in each first wire region B, and sub-pixel units of each row of sub-pixel regions can be connected by two gate lines 1; two columns of sub-pixel regions A are provided between each two adjacent second wire regions C, and a data line 2 is provided in each second wire region C, that is, a data line is provided every two columns of sub-pixel regions, the data line can be respectively connected with sub-pixel units on both sides, and the sub-pixels on both sides connected with the same data line are staggered, and the sub-pixel units connected on both sides are located in different sub-pixel region rows; in the row direction, a common electrode line 8 extending in the column direction is provided between two sub-pixel regions between each two adjacent second wire regions. The common electrode line 8 is electrically connected with the common electrode 4, and the common electrode line separates two adjacent sub-pixel regions in the row direction to avoid cross-color.

Specifically, as shown in FIG. 2, for the above-described arrangement in which a common electrode line is provided between two data lines to separate two sub-pixel regions, the cell-assembling substrate is a color film substrate, and a BM layer 7 is provided on a side of the color film substrate toward the array substrate. The BM layer includes a first shielding portion 71 extending in the row direction and a second shielding portion 72 extending in the column direction, and the orthographic projection of the first shielding portion on the first substrate covers the first wire region; the second shielding portion 72 includes a first sub-shielding portion 721 and a second sub-shielding portion 722. The orthographic projection of the first sub-shielding portion on the first substrate covers the second wire region, and the orthographic projection of the second sub-shielding portion on the first substrate covers the orthographic projection of the common electrode line on the first substrate. According to the pixel structure setting in the above-described display panel, compared with the prior art, the width of the first shielding portion, the width of the first sub-shielding portion and the width of the second sub-shielding portion in the second shielding portion can be appropriately reduced, which can effectively increase the pixel aperture ratio and improve the transmittance.

Specifically, in the above-described display panel, the pixel electrode can be ITO; the common electrode can be ITO. It should be noted that the pixel electrode and the common electrode may be transparent electrodes of other materials, which is not limited in this embodiment.

Specifically, in the above-described display panel, the thin film transistor includes a gate electrode, an active layer, a source electrode and a drain electrode, wherein the gate electrode is electrically connected with the gate line, the source electrode is electrically connected with the data line, and the drain electrode is electrically connected with the pixel electrode. Herein, the gate electrode can be prepared in the same layer as the gate line to reduce the preparation process, and the gate electrode can be directly integrated with the gate line as a unified structure, and the gate electrode is formed by a part of the structure of the gate line; the source electrode and drain electrode can be prepared in the same layer as the data line, thus reducing the preparation process.

The application further provides a display device, which includes any display panel provided by the above-described embodiments.

Apparently, those skilled in the art can make various modifications and variations to the application without departing from the spirit and scope of the application. Thus, if these modifications and variations to the present application fall within the scope of the claims of the present application and their equivalent techniques, the present application is intended to include these modifications and variations.

The invention claimed is:

1. A display panel, comprising: an array substrate, a cell-assembling substrate opposite to the array substrate, and a liquid crystal layer located between the array substrate and the cell-assembling substrate,
wherein the array substrate comprises:
a first substrate, comprising a plurality of sub-pixel regions distributed in an array, a first wire region located between two adjacent rows of sub-pixel regions and a second wire region located between two adjacent columns of sub-pixel regions;
a gate line, located in the first wire region and extending along the first wire region;
a data line, located in the second wire region and extending along the second wire region, wherein the data line is provided with a support portion, and the support portion is located in in intersection region of the first wire region and the second wire region;
a sub-pixel unit, located in the sub-pixel region, wherein the sub-pixel unit comprises a pixel electrode, a common electrode and a thin film transistor; the thin film transistor is electrically connected with the gate line and is electrically connected with the data line; the pixel electrode is electrically connected with the thin film transistor, and an orthographic projection of the common electrode on the first substrate is overlapped with an orthographic projection of a corresponding gate line on the first substrate; and
a spacer, an orthographic projection of the spacer on the first substrate is located within an orthographic projection of the support portion on the first substrate,
wherein the liquid crystal layer comprises a negative liquid crystal,
wherein the first wire region is provided between each adjacent two rows of sub-pixel regions, and two gate lines are provided in each first wire region; two columns of the sub-pixel regions are provided between each adjacent two second wire regions, and one data line is provided in each second wire region;
in a row direction, a common electrode line extending in a column direction is provided between two sub-pixel regions between each adjacent two second wire regions, and the common electrode line is electrically connected with the common electrode.

2. The display panel according to claim 1, wherein: the data line further comprises wire portions located on opposite sides of the support portion in a column direction; and a size of the wire portion in a row direction is less than a size of the support portion in the row direction.

3. The display panel according to claim 1, wherein the pixel electrode or the common electrode within each sub-pixel unit comprises electrode strips arranged in a single domain.

4. The display panel according to claim 1, wherein: the cell-assembling substrate is a color film substrate, and a black matrix (BM) layer is provided on a side of the color film substrate toward the array substrate, and the BM layer comprises a first shielding portion extending in a row direction and a second shielding portion extending in a column direction, an orthographic projection of the first shielding portion on the first substrate covers the first wire region, and an orthographic projection of the second shielding portion on the first substrate covers the second wire region.

5. The display panel according to claim 1, wherein: the cell-assembling substrate is a color film substrate, and a BM layer is provided on a side of the color film substrate toward the array substrate, and the BM layer comprises a first shielding portion extending in the row direction and a second shielding portion extending in the column direction, an orthographic projection of the first shielding portion on the first substrate covers the first wire region; the second shielding portion comprises a first sub-shielding portion and a second sub-shielding portion, an orthographic projection of the first sub-shielding portion on the first substrate covers the second wire region, and an orthographic projection of the second sub-shielding portion on the first substrate covers an orthographic projection of the common electrode line on the first substrate.

6. The display panel according to claim 1, wherein the pixel electrode comprises ITO.

7. The display panel according to claim 1, wherein the common electrode comprises ITO.

8. The display panel according to claim 1, wherein the thin film transistor comprises a gate electrode electrically connected with the gate line, an active layer, a source electrode electrically connected with the data line, and a drain electrode electrically connected with the pixel electrode.

9. A display device, comprising the display panel according to claim 1.

* * * * *